June 23, 1964 J. H. POWERS, JR., ET AL 3,137,942

COORDINATE INSPECTION DEVICE

Filed May 14, 1959 8 Sheets-Sheet 1

INVENTORS
JOHN H. POWERS JR.
FRANK J. FOX
BY [signature]
ATTORNEYS

COORDINATE INSPECTION DEVICE

Filed May 14, 1959 8 Sheets-Sheet 2

INVENTORS
JOHN H. POWERS JR.
FRANK J. FOX
BY
ATTORNEYS

COORDINATE INSPECTION DEVICE

Filed May 14, 1959

INVENTORS
JOHN H. POWERS JR.
FRANK J. FOX
BY
ATTORNEYS

COORDINATE INSPECTION DEVICE
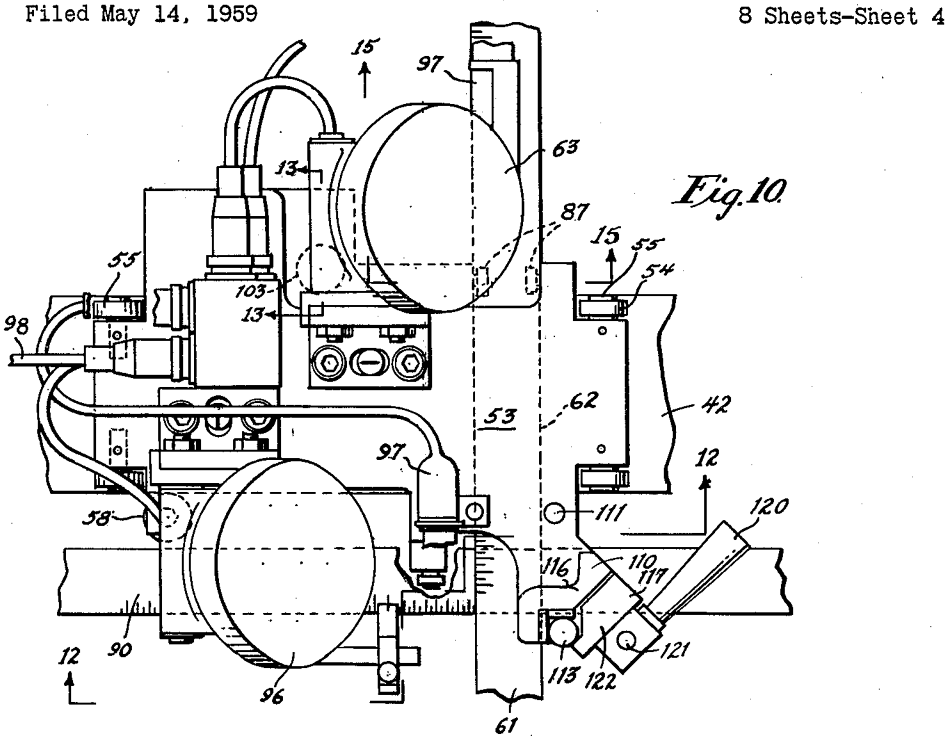
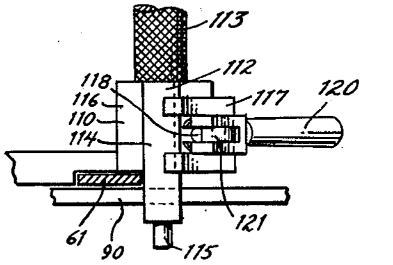
Fig. 12.
Fig. 11.
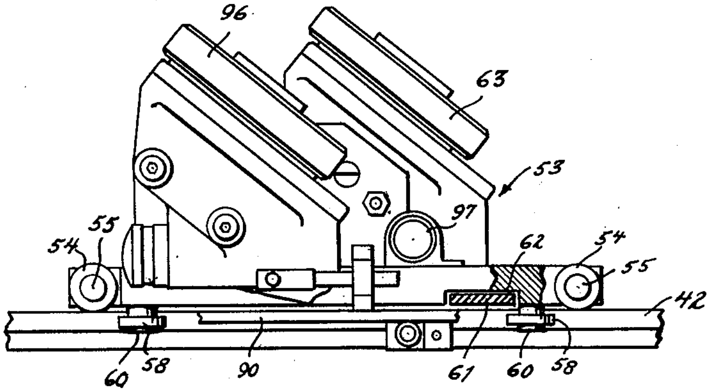
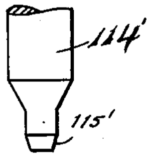
Fig. 11a.
INVENTORS
JOHN H. POWERS JR.
FRANK J. FOX
BY
ATTORNEYS

INVENTORS
JOHN H. POWERS JR.
FRANK J. FOX
BY
ATTORNEYS

COORDINATE INSPECTION DEVICE

Filed May 14, 1959

8 Sheets-Sheet 6

INVENTORS
JOHN H. POWERS JR.
FRANK J. FOX
BY
ATTORNEYS

INVENTORS
JOHN H. POWERS JR.
FRANK J. FOX
BY
ATTORNEYS

COORDINATE INSPECTION DEVICE

Filed May 14, 1959 8 Sheets-Sheet 8

INVENTORS
JOHN H. POWERS JR.
FRANK J. FOX
BY
ATTORNEYS

United States Patent Office 3,137,942
Patented June 23, 1964

3,137,942

COORDINATE INSPECTION DEVICE

John H. Powers, Jr., Norristown, and Frank J. Fox, Blue Bell, Pa., assignors to Wiedemann Machine Company, King of Prussia, Pa., a corporation of Pennsylvania Filed May 14, 1959, Ser. No. 813,278
7 Claims. (Cl. 33—1)

The present invention relates to an inspection table which is useful for inspection of templates, jigs, especially drill jigs, mock ups, fixtures, flat work, and the like.

A purpose of the invention is to simplify the procedure of coordinate inspection to such an extent that it can be accomplished quickly by relatively less skilled personnel.

A further purpose is to accelerate the operation of coordinate inspection, so that under favorable conditions all points can be inspected and their coordinates determined within a minute.

A further purpose is to make coordinate measurements more accurate and more reproducible, and to reduce the possibility of error.

A further purpose is to eliminate the necessity for considerable set up time and for mounting of special inspection fixtures and inspection gauges for coordinate inspection.

A further purpose is to eliminate the necessity for computations in connection with coordinate location, avoiding particularly such features as gauge compensation correction and the like which have been required in previous coordinate inspection.

A further purpose is to resiliently bias coordinate inspection scale means so that temperature changes and misadjustments and other factors which may cause deflection of other component parts will not influence the accuracy of the scale reading.

A further purpose is to mount scales on a coordinate inspection table to move with an optical carrier, and to springload the scales against zero reference points so as to obtain greater accuracy.

A further purpose is to provide a T-arm slider with rollers which follow a reference line, to pivot a scale on the T-arm slider, to extend the scale transversely of the reference line and to spring urge the scale and the T-arm slider from the end of the scale remote from the slider so as to assure that the scale will be brought to a position at right angles to the reference line after the scale moves to a new location.

A further purpose is to permit convenient color coding of templates to facilitate inspection.

A further purpose is to facilitate scale reading on a coordinate inspection table by providing differential coloring of respective scale units.

A further purpose is to positively position a feeler or reference element in respect to a hole or opening whose coordinates are being checked and then to make coordinate readings in respect to the position of the feeler element.

A further purpose is to provide relatively spaced holes in the template, and to provide a slight taper on a feeler or reference element, so that it will be permitted to cooperate with any template hole of a range of diameters.

A further purpose is to permit very accurate coordinate readings suitably of the order of 0.0005 inch.

A further purpose is to locate the stylus with respect to a hole being checked, and then to rigidly clamp the stylus with respect to the optical mounting in order to precisely locate the optical mounting with respect to the proper stylus position.

A further purpose is to mount a power cable reel on a sliding bridge so that power can be provided for illuminators and the like which move along the bridge.

Further purposes appear in the specification and in the claims.

In the drawings we have chosen to illustrate one only of the numerous embodiments in which the invention may appear, selecting the form shown from the standpoints of convenience in illustration, satisfactory operation and clear demonstration of the principles involved.

FIGURE 10 is an enlarged fragmentary top plan view of the optical elements and their mounting and the stylus and its mounting.

FIGURE 11 is a fragmentary end elevation of the stylus mounting in FIGURE 10.

FIGURE 11*a* is a view similar to a portion of FIGURE 11 showing a modified form of stylus.

FIGURE 12 is a section on the line 12—12 of FIGURE 10.

Figure 13:
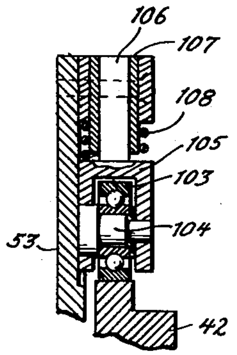

FIGURE 13 is a section on the line 13—13 of FIGURE 10.

Figure 14:
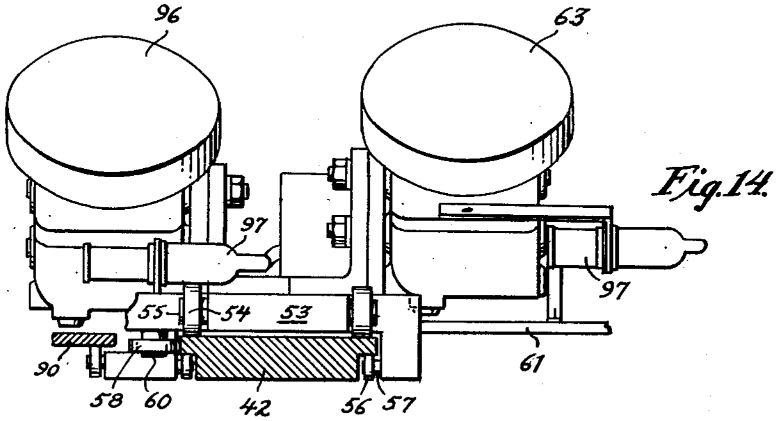

FIGURE 14 is a front elevation of the structure of FIGURE 10.

Figure 15:
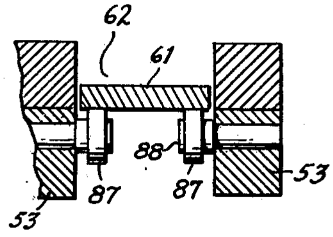

FIGURE 15 is an enlarged section on the line 15—15 of FIGURE 10.

Figure 16:
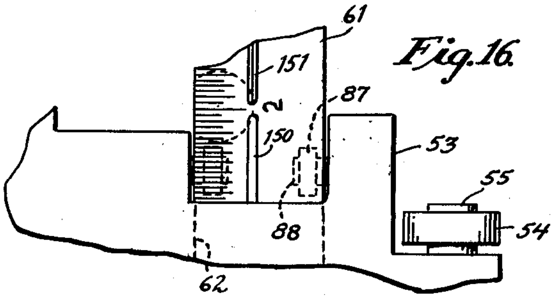

FIGURE 16 is a fragmentary top plan view of the structure of FIGURE 15.

Figure 1:
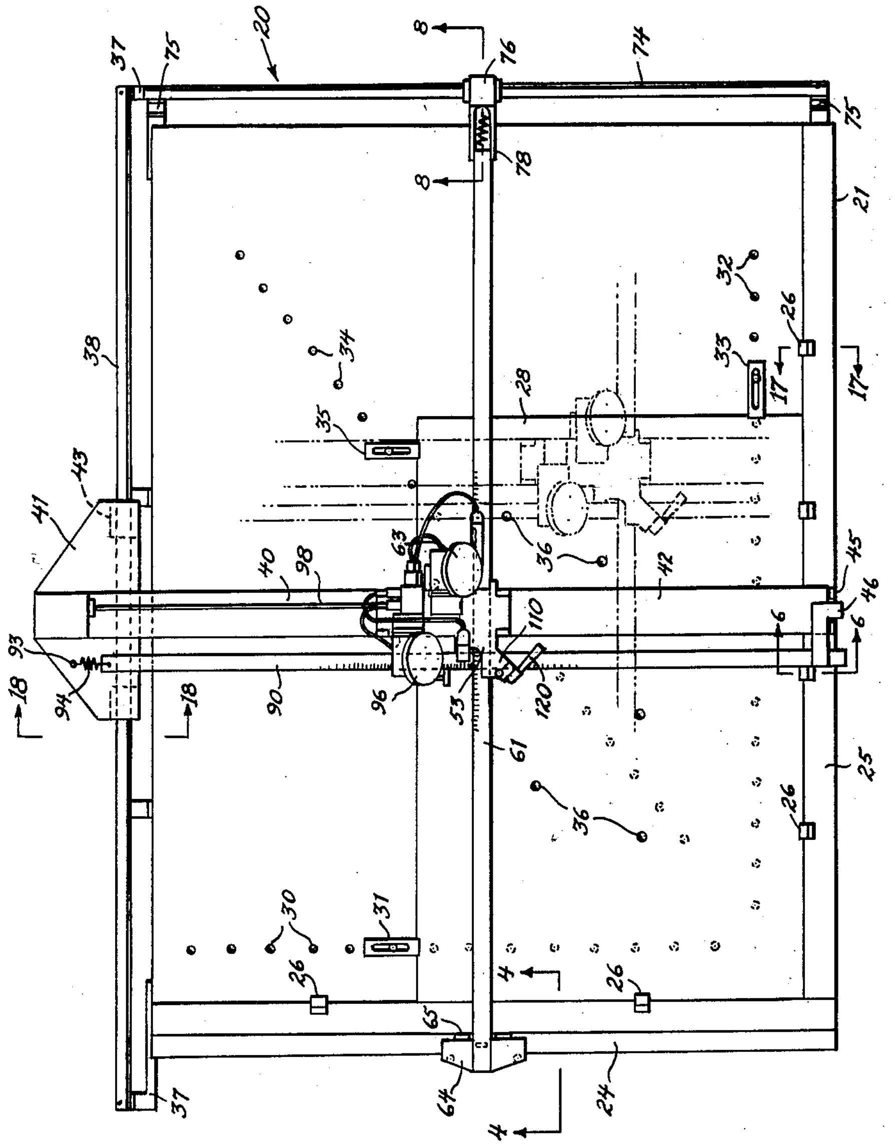
FIGURE 1 is a top plan view of a coordinate inspection table embodying the principles of the invention.
Figure 17:
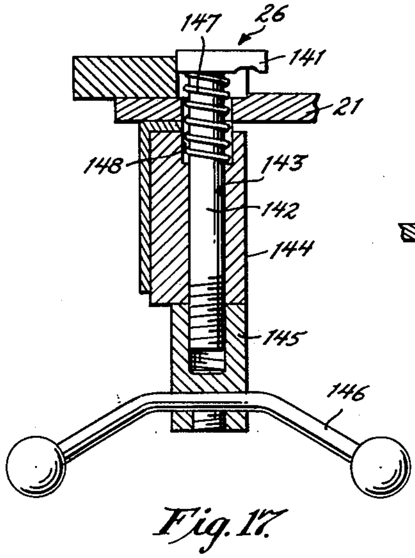

FIGURE 17 is an enlarged fragmentary section on the line 17—17 of FIGURE 1 through one of the clamps.

Figure 18:
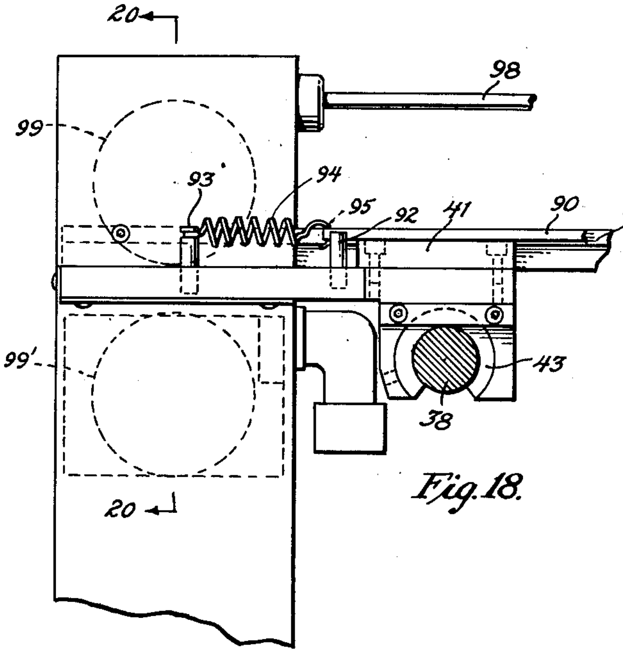

FIGURE 18 is an enlarged fragmentary section on the line 18—18 of FIGURE 1.

Figure 19:
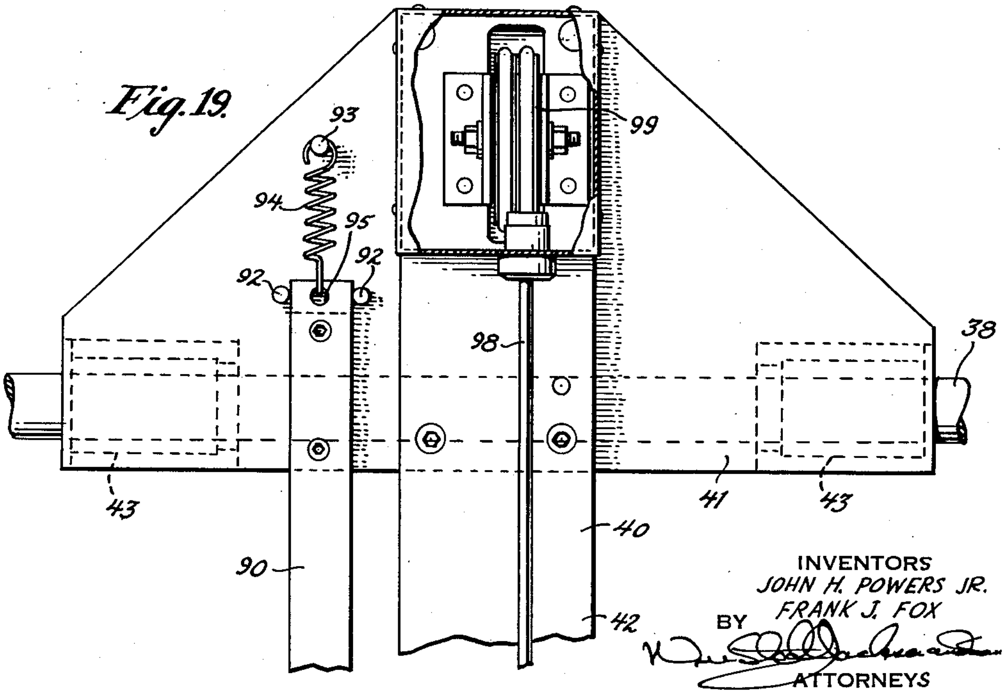

FIGURE 19 is a fragmentary top plan view of FIGURE 18 with the reel housing broken away.

Figure 20:
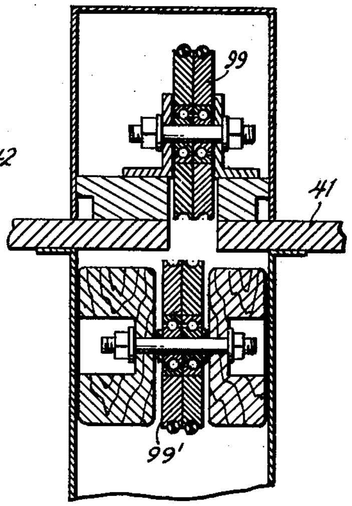

FIGURE 20 is a fragmentary section on the line 20—20 of FIGURE 18.

Figure 21:
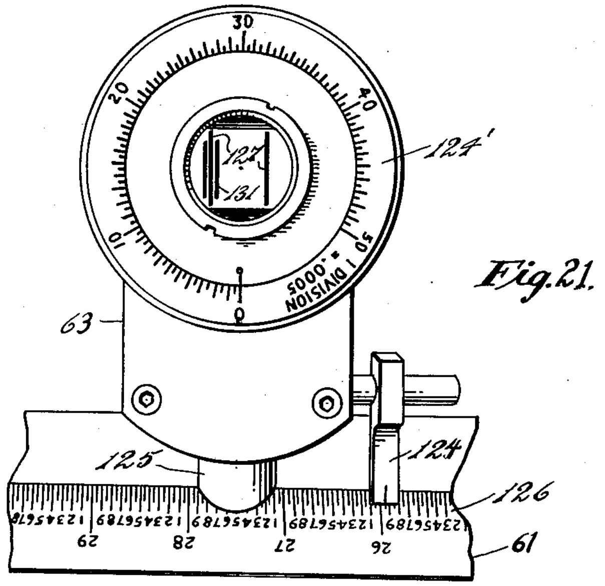

FIGURE 21 is a fragmentary front view of an illuminated magnifying viewer equipped with an optical vernier and scale.

Figure 22:
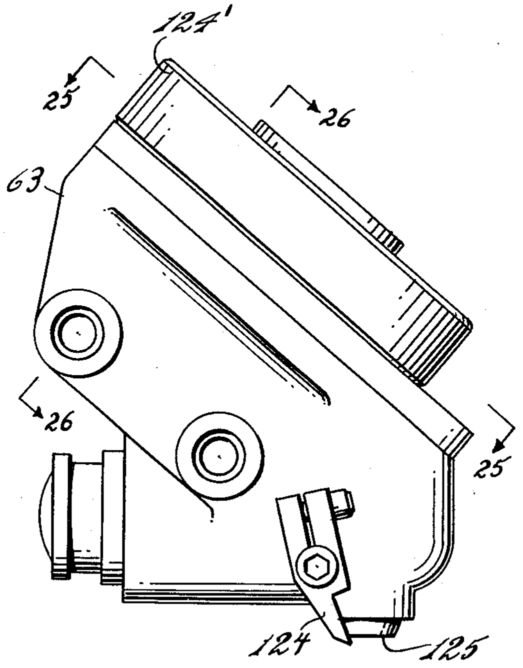

FIGURE 22 is a side elevation of the viewer of FIGURE 21 omitting the graduated scale.

Figure 23:
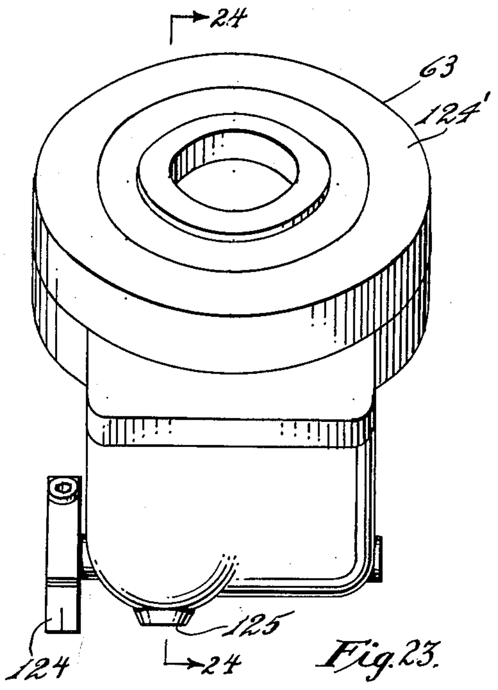

FIGURE 23 is a front elevation of the viewer of FIGURE 21.

Figures 24, 25, 26, 27, 28, 29:
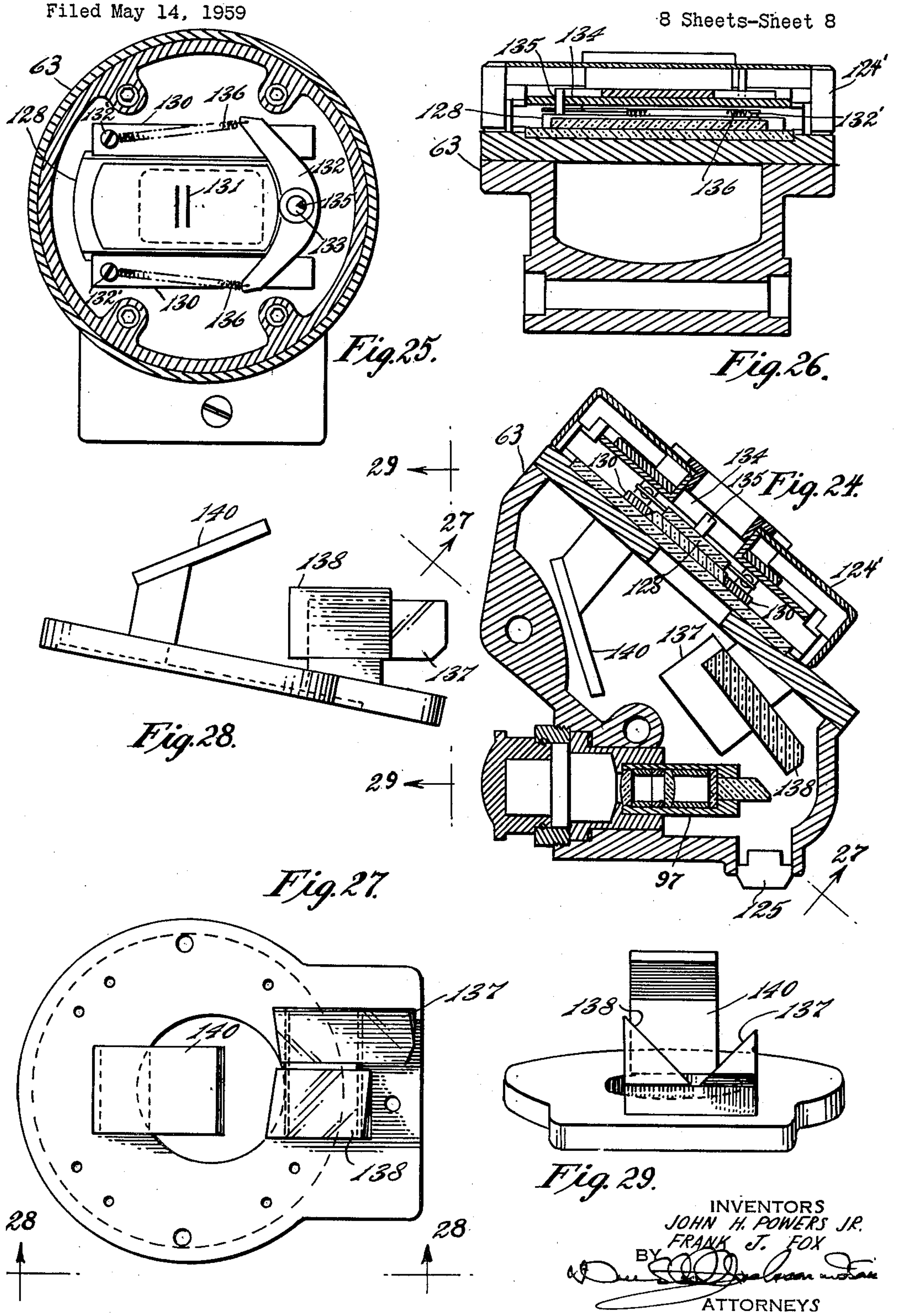

FIGURE 24 is a section on the line 24—24 of FIGURE 23.

FIGURE 25 is a fragmentary section on the line 25—25 of FIGURE 22.

FIGURE 26 is a fragmentary section on the line of 26—26 of FIGURE 22.

FIGURE 27 is a fragmentary section taken on the line 27—27 of FIGURE 24.

FIGURE 28 is a section on the line 28—28 of FIGURE 27.

FIGURE 29 is an elevation on the line 29—29 of FIGURE 28.

Describing in illustration but not in limitation and referring to the drawings:

In the present practice, especially in fabricating operations, there is frequent need for precise positioning of holes on master control elements such as templates, jigs and fixtures and also on individually inspected components. Suitable examples are templates which are used for controlling punch presses and the like, drill jigs, and other similar elements. There are also examples in the manufacture of molds where very accurate hole location must be achieved.

In connection with work of the character described, it is necessary after holes are initially produced in templates, drill jigs and similar parts, to inspect to determine whether the holes are properly located. In the prior art this has been a tedious, exacting, time-consuming, and often rather inaccurate procedure. The template or other part has usually been clamped to an angle plate and accurate measurments have been made from the edge to each individual hole by a vernier height gauge and indicator.

After all coordinates from one edge have been determined, the process has been repeated following turning the template 90°. Even with a skilled inspector it usually requires on the average from two to five minutes to determine each hole location by this method, and the measurement frequently involves computations which add or subtract compensations for the particular measuring device. Experience has indicated that the results are frequently inaccurate or inconsistent. Once the part is removed from the angle plate, further measurements are extremely difficult because it is difficult to reestablish the reference axis.

The difficulties with the inspection above referred to are further complicated when the components are of light gauge, subject to warpage and localized deformations which cause inaccuracy by introducing a third dimensional component.

The present invention as already described greatly simplifies the coordinate inspection technique and makes it possible to use semiskilled personnel. Based upon tests made with the device of the present invention it has been found that a semiskilled worker can precisely locate several different holes to an accuracy of less than 0.001 inch within the time required by a skilled worker to locate a single hole under the old technique.

Considering now the drawings in detail, we illustrate a table 20 suitably provided with a bed 21, conveniently of metal, which may be mounted in any desired position but is preferably positioned horizontally as shown on a structure consisting of sides 22 supported on adjustable legs 23.

The table bed has accurately located thereon a locator strip 24 at one edge and a locator strip 25 at right angles thereto at another edge. The locator strips are conveniently recessed to provide openings for clamps 26 at the sides which suitably lock against the table a template or other work piece 28 which is to be checked.

The table is conveniently provided with one set of clamp openings 30 parallel to strip 24, which receive a clamp 31 at a selected position, a second set of clamp openings 32 which are located at right angles and receive a clamp 33 at a suitable position, and a diagonal set of clamp openings 34 which receive clamp 35 at a properly determined position.

The clamp can be of any conventional character, suitably used for locating work on a table.

The template 28 is provided with suitable openings 36 distributed around its surface as desired by the designer, and the table is so constructed as to determine the coordinates of these openings.

At one edge of the table, brackets 37 carry a shaft 38 which is generally in parallel relation to the locator edge of locator strip 25. A table carriage 40 consisting of a bearing plate 41 and a bridge 42 at right angles thereto rides on the shaft 38 which is engaged by the bearing plate. At the opposite end the bridge 42 rides on the locator strip 25 as will be described.

The bearing plate 41 mounts thereon at opposite ends suitable sliding bearings 43 which ride the shaft 38, and are placed far enough apart to prevent any tendency of the table carriage to bind.

Figure 6:
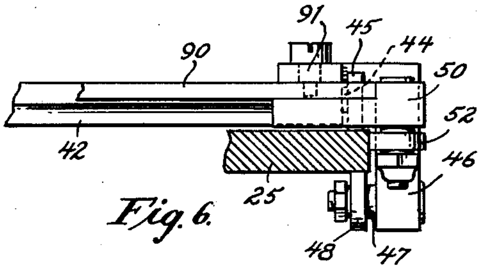
FIGURE 6 is an enlarged fragmentary section on the line 6—6 of FIGURE 1.
Figure 7:
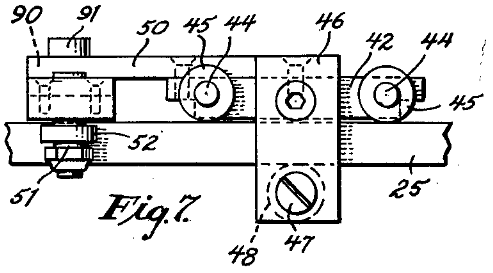
FIGURE 7 is an enlarged fragmentary front elevation of a portion of the structure shown in FIGURE 6.

At the end remote from the shaft 38, the bridge 42 carries spaced stub shafts 44 which mount on suitable antifriction bearing rollers 45 (FIGURES 6 and 7). The rollers ride the top of the locator strip 25. The end of the bridge also carries a bracket 46 which at a position located between the stub shafts 44 and below the locator strip mounts a stub shaft 47 which on the inner end journals an antifriction bearing roller 48 riding the underside of the overhanging edge of the locator strip 25.

The end of the bridge also carries a bracket 50 which extends longitudinally along the locator strip and beyond it and at its outer end carries a stub shaft 51 which extends down over the outside edge of the locator strip 25, and carries a roller 52 which rides the outside edge of the locator strip.

The table carriage 40 mounts in laterally slidable relationship an optical carriage 53 best seen in FIGURES 10, 12 and 14. The optical carriage has at its two ends two sets of rollers 54 secured on stub shafts 55 best seen in FIGURE 14. The optical carriage is held in place on the bridge by rollers 56 mounted on shafts 57 which are journalled at the two sides of the optical carriage engaging the under side of a rim of the bridge as best seen in FIGURE 14. The optical carriage also has at the two sides, engaging sides of the bridge, rollers 58 on stub shafts 60 as best seen in FIGURE 14.

Figure 5:
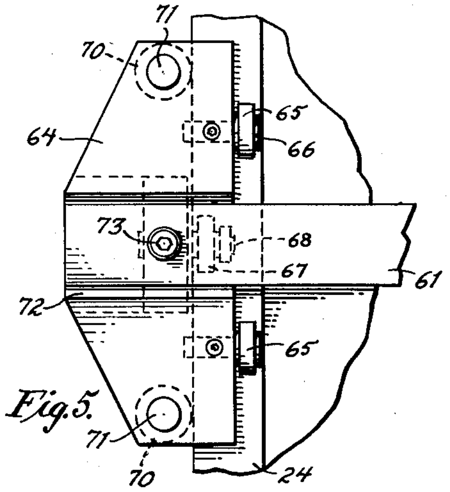
FIGURE 5 is a fragmentary top plan view of the structure shown in FIGURE 4.
Figure 4:
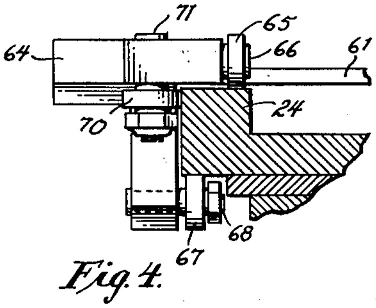
FIGURE 4 is a fragmentary enlarged section on the line 4—4 of FIGURE 1.

An X-axis scale 61, which is capable of sliding forward and back in a manner to be described, extends through a recess 62 in the optical carriage, and is in line with the field of view of an illuminated magnifying optical viewer 63 which may be of well known character, equipped with an optical vernier, which will permit precise readings as later described. The scale 61 at one end as best seen in FIGURES 4 and 5 is connected to a T-head 64 which is provided with a pair of spaced aligned rollers 65 engaging the top of the locator strip 24 and turning on shafts 66 secured to the T-head 64, and at a point intermediate between the positions of the roller 65 the T-head has mounted thereon, engaging the bottom of the locator strip 24, a roller 67 journalled on a stub shaft 68 on the T-head. At widely spaced points engaging the outside of the locator strip 24, which is provided with a precise locator edge, there are rollers 70 journalled on stub shafts 71 on the T-head.

The scale 61 is mounted in a recess 72 extending across the T-head, with adequate clearance so that the sides of the recess will leave the scale free to adjust with respect to the T-head and achieve a right angle relationship as later described. The scale 61 is connected to the T-head merely by pivot bearing 73 on a vertical axis. The scale is zeroed when the T-head engages the reference strip and the scale is at right angles to the reference strip.

Figure 2:
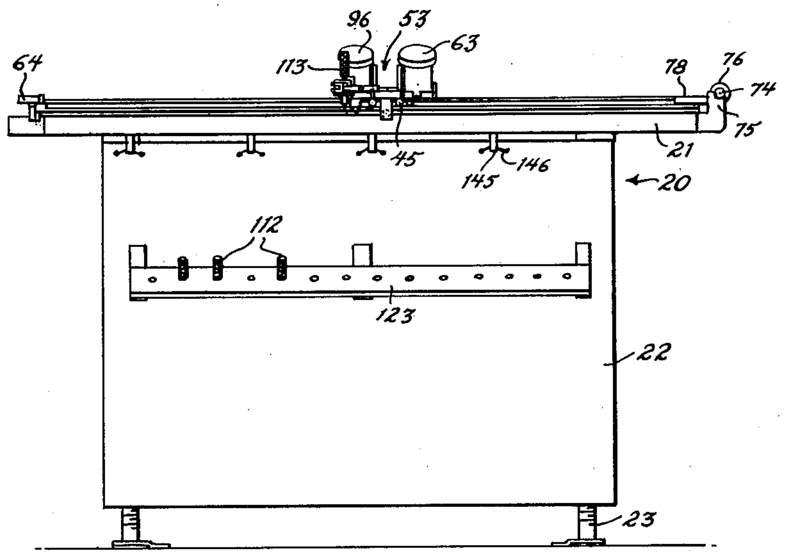
FIGURE 2 is a fragmentary front elevation of the inspection table of FIGURE 1.
Figure 3:
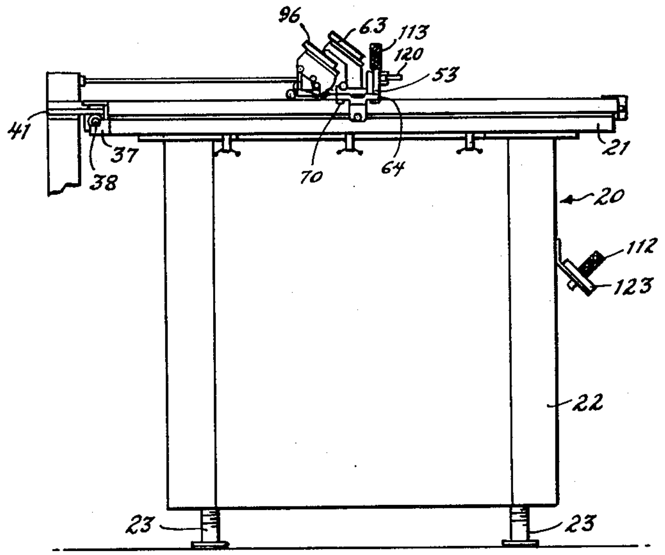
FIGURE 3 is a fragmentary left hand elevation of the inspection table of FIGURE 1.
Figure 9:
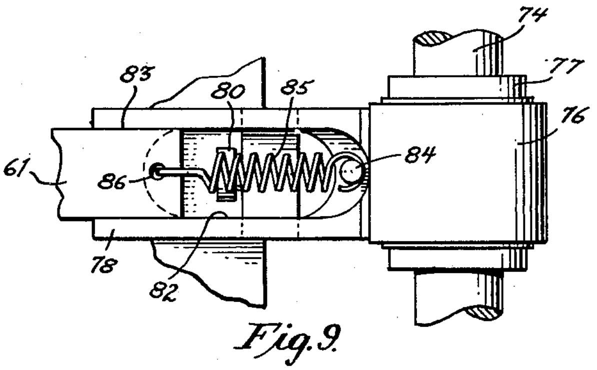
FIGURE 9 is a fragmentary top plan view of the structure shown in FIGURE 8.
Figure 8:
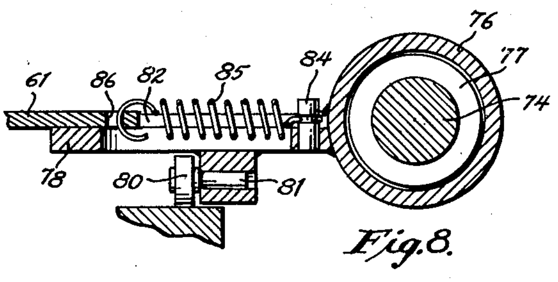
FIGURE 8 is an enlarged section on the line 8—8 of FIGURE 1.

At the remote end of the scale 61, as best seen in FIGURES 8 and 9, there is a shaft 74 extending at the edge of the table parallel to the locator strip 24 and supported at the ends on brackets 75 (FIGURE 2). A bearing plate 76 slides along the shaft 74 on spaced sliding bearings 77 riding the shaft 74 as best seen in FIGURES 8 and 9. The bearing plate 76 has an extension 78 which is over the table and is supported by a roller 80 riding on the top of the table parallel to locator strip 24 and journalled on stub shaft 81 on the bottom of the bearing plate 76. The extension 78 has a slot 82 whose walls at 83 guide the sides of the end of the scale 61. A spring abutment 84 on the locator plate 78 anchors one end of helical tension spring 85 whose opposite end is connected in an opening 86 at the end of scale 61. It will thus be evident that the scale is freely pivoted on the T-head and pulled by the tension spring 85 and it constantly will be brought to a position at right angles to the locator strip 24 because the spring tends to bring the scale to the shortest line relationship to the locator strip 24, which corresponds to the right angle position.

As the scale 61 passes through the optical mounting, it is supported as shown in FIGURES 15 and 16 at the precise focusing height by spaced trunnion rollers 87 beneath the scale mounted on stub shafts 88 supported on the optical carriage 53.

A Y-axis scale 90 as best seen in FIGURES 1, 10, 11 and 12, extends in front to back relationship across the table, and at the forward end is mounted on the bracket 50 from the end of the bridge (FIGURES 6 and 7).

The scale 90 rides across the table with the bridge. At one edge of the table the scale 90 is pivoted at 91 on the bracket 50 (FIGURES 6 and 7) which extends from one edge of the bridge and which is guided in spaced relation against the side of the locator strip 25. The scale 90 passes across to the opposite end of the table or it rests on bearing plate 41 (FIGURES 18 and 19) and is guided with lateral freedom for adjustment by guiding pins 92. A spring abutment 93 on bearing plate 41 engages one end of helical tension spring 94, the opposite end of which engages in a recess 95 in the end of the scale, pulling the scale under suitable tension so that the tension will tend to bring the bracket 50 to a proper position so that the scale will be exactly at right angles to the guiding strip 25. The scale 90 is zeroed when the bracket 50 is in place and the scale is transverse to its reference strip.

The scale 90 at the point where it passes through the optical mounting is supported on trunnion rollers in the manner already described in reference to FIGURES 15 and 16, so that a magnifier reading device which is suitably a duplicate of the device already described, but reading in transverse direction, is in position to read the scale 90.

The optical reading devices are provided with suitable illuminators 97 (FIGURES 10, 12 and 14), which are connected through intermediate electrical cables with a feed cable 98 (FIGURE 18) which extends across the machine, and winds around a reel consisting of upper rollers 99 and lower rolls 99' (FIGURES 19 and 20) mounted on suitable bearings on the bearing plate 41. The electrical cable is maintained under tension and taken up from the reel by a suitable tension storage device not shown.

It should be noted that the side rollers of the optical carriage include the two spaced rollers 58 engaging one side of the bridge, and on the other side positioned intermediately there is a resiliently mounted roller 103 as shown in FIGURE 13, whose shaft 104 is positioned in a yoke 105, which is mounted on a plunger 106 on the optical carriage, which plunger slides in a sliding bearing 107 and is urged by helical compression spring 108 to maintain firm engagement of the roller 103 with the side of the bridge.

The optical carriage carries a stylus bracket 110 (FIGURES 1, 10 and 11) which is adjustably mounted on the carriage by bolts 111. The stylus 112 has an enlarged head 113 which is used as a handle for the operator, a reduced clamping body 114, and a stylus feeler extension 115 which is adapted to enter the opening 36 whose coordinates are being measured in the template or other work. The bracket includes a fixed clamping jaw 116 (FIGURES 10 and 11) which cooperates with a movable jaw 117 and surrounds opposite sides of the body 114 of the stylus. The fixed clamp jaw 116 is suitably of U formation. A clamping bolt 118 is carried through an opening in the movable jaw and threaded into the fixed jaw and is operated by handle 120. The handle 120 is suitably pivoted on the bolt 118 at 121 and has a cam surface 122 which cooperates with a flat surface on the movable jaw so that quick tightening can be accomplished by means of the swinging of the handle around its pivot 121.

It will be understood that once the stylus has entered into the opening which is to be located, at which time the stylus is suitably unclamped and has then been clamped, the operation of clamping the stylus brings the optical carriage into the correct relation with the stylus to make a reading.

In FIGURE 11*a* I show a modified form of stylus 114' whose end is gradually tapered at 115', suitably at an angle of about $22\frac{1}{2}°$ to the stylus axis, so that the stylus end can enter inspection holes which have slightly different diameters by moving forward to slightly different distances. Thus one stylus can function for inspection holes of $\frac{3}{32}$ to $\frac{5}{32}''$ diameter and another stylus can function for inspection holes of $\frac{5}{32}$ to $\frac{1}{4}''$ diameter. At the side of the machine I place a rack 123 (FIGURE 2) which has sockets in which a number of different size styluses can be placed.

Each viewer has a reading index 124 which coordinates with the scale reading which should be read. The viewer is a vernier equipped with a rotating vernier head 124'.

To make a reading, the illuminated magnifying optical viewers 63 and 96 equipped with optical verniers are used. Each of these viewers consists of a lens 125 positioned over the graduations 126 on the scale 61 at a distance of approximately $\frac{1}{8}$ inch. In this position, the image of one or two lines 127 of the graduations 126 on the scale 61 will appear in the eyepiece 128 which is free to slide in the gibs 130.

Inscribed on eyepiece 128 is the reticle 131 consisting of two lines parallel to the image lines 127. Pivot arm 132 is pivotally connected to eyepiece 128 at 133. Cam 134 slidably contacts post 135 mounted on eyepiece 128 and forces the eyepiece away from a spring biased position created by helical tension springs 136 acting through the pivot arm 132 from spring abutments 132'.

The amount of rotation of the vernier dial 124 to which is fixed the cam 134 determines the distance the eyepiece and reticle is moved from its spring biased zero position.

Thus, after the stylus is clamped in position, the vernier dial is rotated until the reticle 131 straddles one of the image lines 127 as shown in FIGURE 21.

The image lines are projected by illuminator 97 from the scale graduations 126 through lens 125 to angular mirrors 137 and 138 to flat mirror 140 to eyepiece 128. The lens 125 and mirrors magnify the graduations to yield a suitably enlarged image in the well known manner.

In FIGURE 17 I illustrate a detail of one of the template clamps 26. The clamp 26 has a movable jaw 141 which is pulled down against the table 21 to grip the template by a clamping bolt 142 passing through an opening 143 in the table frame member 144. On the lower end of the bolt, nut 145 is threaded and the nut is operated by handle 146.

A helical compression spring 147 surrounds the bolt in a spring recess 148 and urges the clamp toward open position.

In operation, when the template 28 is placed against the locator strips 24 and 25, and the stylus 112 is dropped into one of the holes 36, the image of a scale graduation line 127 will appear somewhere on the eyepiece 128. The vernier dial 124 mounting cam 134 slides eyepiece 128 until reticle 131 straddles the image line 127. We now have a micrometer reading on the vernier dial 124.

To obtain the measurement of the hole 36 in question, the graduation to the left of scale indicator 123 is read on scale 61. To this dimension is added the micrometer reading on the vernier dial 124.

FIGURE 21 shows one of the magnifying reading devices in its relation to the scale. It will be evident that a scale indicator 123 there shown is mounted thereon and coordinates therewith the optical center of the magnifier reading device, and after the stylus is clamped the operator manipulates the vernier dial 124 until the two short reference lines accurately bridge the opposite sides of the scale reading reflected in the field of view. The operator then reads as his final coordinate reading the reading of the scale indicator, and also the vernier reading which indicates the fraction of the scale division.

In order to guard against the possibility of reading the adjoining unit of length such as the adjoining inch rather than the correct unit of length, we place different color coding strips 150 and 151 (FIGURE 16) opposite different main units such as inches, so that distinctive colors will show adjoining the readings in the viewer. The man operating the table, when he shifts his observation to use the naked eye in viewing the scale, is readily able to tell which main unit he has been observing when looking in the viewer by the color.

In operation, in using the device of the invention, with the table clear of the work, a suitable template or other piece of work provided with two rectangular edges (at right angles) including one straight edge is positioned with the straight edge against one of the reference strips 24 or 25, and with the reference corner positioned against the corner where the two reference strips intersect. The template or other work is then clamped in place. Starting with any hole on the template, and using the handle on the stylus as a means of manipulating the stylus, the optical carriage, the table carriage and also the scales, the operator brings the stylus into position above the hole, and, the stylus being unclamped, enters the stylus into the hole. It will of course be understood that if the size of the template hole is not correct, the stylus must be replaced by another stylus or a stylus adaptor must be used.

Having inserted the stylus into the hole, the operator next tightens the stylus clamp by manipulating the handle 120, and as soon as the stylus clamp tightens, the stylus by the clamping action is brought into correct position transverse to the frame of the table. The clamping of the stylus has the effect of causing the lost motion of the optical carriage with respect to the scales to take place, and assuring that all of the parts are properly positioned to measure the coordinates.

The user then adjusts each of the verniers until the bridging marks seen in the field of view bridge a particular scale mark. The user reads the next lowest indicator scale position, and adds to it the vernier fraction.

It will be evident that no matter where the hole 36 is located, the scales are maintained in their proper relation to the reference strips by spring action and if it were possible to move the optical carrier so rapidly that the scales were deflected from their correct right angle relation they would immediately be restored to such relationships by the springs once the stylus became stationary.

It will be evident that the invention is applicable to relatively large size work, as large for example as 36 x 42 inches or even considerably larger, and it also can be applied to relatively small templates and other work. It will be evident that the invention provides consistent coordinate readings of holes within plus or minus 0.001 inch or closer, without the necessity of making computations, and with great ease in rechecking every new question which arises.

In the preferred embodiment, the scale readings between two main readings as for example between one inch and the next inch, are made of a particular color, and those beyond the next main reading until the next subsequent one is encountered are of a still different color, so that it is possible by inspection immediately to tell when the main reading changes. This protects the operator against the mistake of reading the next higher reading rather than the next lower reading.

Many times it is desirable to color code the holes in the template, and the table of the invention lends itself readily to this purpose since the optical carrier can be moved out of the way. As soon as the particular hole has been inspected and marked, binding or printing techniques can be applied to indicate the desired color code. In case the template has a great many holes this also serves to protect the operator against inadvertently inspecting the same hole more than once.

In view of our invention and disclosure variations and modifications to meet individual whim or particular need will doubtless become evident to others skilled in the art, to obtain all or part of the benefits of our invention without copying the structure shown, and we, therefore, claim all such insofar as they fall within the reasonable spirit and scope of our claims.

Having thus described our invention, what we claim as new and desire to secure by Letters Patent is:

1. In a coordinate inspection device, a table bed, reference strips secured to edges of the bed in right angle relation, means to secure work to the bed against the reference strips, guide means extending along the edges of the bed remote from the reference strips in generally parallel relation to the reference strips, a table carriage riding one of said guide means and extending across the bed to the reference strip at the opposite side, a first scale slidable across the table extending generally parallel to the table carriage and adjacent to the table carriage from the guide means last mentioned to the reference strip at the opposite side, means for maintaining the first scale perpendicular to the reference strip at one end thereof as it moves longitudinally of said reference strip, a second scale extending transverse to the first scale and slidable across the table guided at one end on the other guide means and extending across to the other reference strip for maintaining said second scale perpendicular to said other reference strip, a reading device slidable on said table carriage and reading both said first scale and said second scale in any position of the scales on the table, the reading device sliding together with said scales and means for correlating said reading device with particular coordinates on the work.

2. An inspection device of claim 1, in which said means for correlating said reading device with particular coordinates on the work comprises a stylus.

3. An inspection device of claim 2, in which said stylus is adapted to be inserted into an opening in the work.

4. An inspection device of claim 1, in which said means for correlating said reading device with particular coordinates on the work comprises a stylus adapted to be inserted in an opening in the work, and means for clamping the stylus in a position at right angles to the work and fixing the stylus in relation to said reading device.

5. In a coordinate inspection table, a table bed, reference strips extending at right angles to one another and secured at edges to the bed, scales extending at right angles to one another and slidable across the bed, means for maintaining said scales at right angles to the said reference strips, a table carriage, guide means supporting the table carriage and permitting the table carriage to move across the table, a reading device reading both of said scales and slidable with respect thereto, means for permitting movement of the reading device along the table carriage, means correlating the position of the reading device to particular reference coordinates on the work, means for securing work to the bed against the reference strips, means on the reading device to maintain the relation of said scales to the reading device and to retain said scales in readable position as the reading device moves across the bed, and manually operable means on the reading device to permit the operator to move the reading device, the table carriage and the scales together.

6. In an inspection device, an optical carriage having an X-axis optical reading device and a Y-axis optical reading device positioned thereon, a stylus secured to the optical carriage in particular relation thereto, stylus releasing means permitting selective advance and retraction of the stylus and permitting clamping of the stylus in right angle relation to the work, means for establishing and clamping work in fixed relation to X and Y coordinates, an X-scale extending across and slidable over the work and secured in readable relation to the X-axis optical reading device, a Y-scale extending across and slidable over the work and secured in readable relation to the Y-axis optical reading device, and means for maintaining a parallel relation between the X-scale and the X-coordinate axis, and between the Y-scale and the Y-coordinate axis.

7. In a coordinate inspection device, a table bed, a bridge extending across the bed and slidable with respect thereto, optical carriage slidable on the bridge, roller means guiding the optical carriage laterally and also vertically as it slides along the bridge, scales crossing one another at the optical carriage and slidable across the bed, means for maintaining said scales at right angles notwithstanding their sliding motion, and stylus means secured on the optical carriage to engage the work in relation thereto.

References Cited in the file of this patent

UNITED STATES PATENTS

| | | |
|---|---|---|
| 744,587 | Moehle | Nov. 17, 1903 |
| 977,765 | White | Dec. 6, 1910 |
| 1,440,510 | Trueblood et al. | Jan. 2, 1923 |
| 2,287,072 | Townsend | June 23, 1942 |
| 2,497,981 | Gramont | Feb. 21, 1950 |
| 2,568,358 | Nahmens | Sept. 18, 1951 |
| 2,618,860 | Engelhart | Nov. 25, 1952 |
| 2,805,479 | Droste | Sept. 10, 1957 |
| 2,854,751 | Casey | Oct. 7, 1958 |
| 2,901,832 | Hulen | Sept. 1, 1959 |
| 2,954,609 | Goertz | Oct. 4, 1960 |

FOREIGN PATENTS

| | | |
|---|---|---|
| 674,961 | Great Britain | July 2, 1952 |